United States Patent
Maalouf et al.

(10) Patent No.: US 12,534,218 B2
(45) Date of Patent: Jan. 27, 2026

(54) FUEL CONDITIONING SYSTEM FOR SUPPLYING AN AIRCRAFT TURBOMACHINE, AND METHOD OF SUPPLYING A TURBOMACHINE

(71) Applicant: SAFRAN, Paris (FR)

(72) Inventors: Samer Maalouf, Moissy-Cramayel (FR); Hugo Pierre Mohamed Jouan, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/703,003

(22) PCT Filed: Oct. 14, 2022

(86) PCT No.: PCT/EP2022/078623
§ 371 (c)(1),
(2) Date: Apr. 19, 2024

(87) PCT Pub. No.: WO2023/072623
PCT Pub. Date: May 4, 2023

(65) Prior Publication Data
US 2024/0417099 A1    Dec. 19, 2024

(30) Foreign Application Priority Data

Oct. 29, 2021  (FR) ...................... 2111578

(51) Int. Cl.
*B64D 37/34*     (2006.01)
*B64D 37/30*     (2006.01)
(Continued)

(52) U.S. Cl.
CPC ............ *B64D 37/34* (2013.01); *B64D 37/30* (2013.01); *F02C 3/22* (2013.01); *F02C 7/224* (2013.01);
(Continued)

(58) Field of Classification Search
CPC ........ F02C 3/22; F02C 7/224; F05D 2240/36; B64D 37/34; F25J 1/0223; F25J 3/04078;
(Continued)

(56) References Cited

U.S. PATENT DOCUMENTS 5,203,174 A * 4/1993 Meyer ..................... F02C 7/224
60/734
6,263,678 B1   7/2001 Suttrop
(Continued)

FOREIGN PATENT DOCUMENTS

EP    1672270 A2    6/2006
FR    2681641 B1    9/1994

OTHER PUBLICATIONS

International Search Report for PCT/EP2022/078623, dated Jan. 27, 2023, 2 pages.
(Continued)

*Primary Examiner* — Stephanie Sebasco Cheng
(74) *Attorney, Agent, or Firm* — RANKIN, HILL & CLARK LLP

(57) ABSTRACT

A fuel conditioning system configured to supply an aircraft turbomachine with fuel from a cryogenic tank. The conditioning system comprising a primary heat exchanger designed to heat the fuel flow to at least one primary temperature, and at least one secondary heat exchanger, mounted downstream of the primary heat exchanger, designed to heat the fuel flow to at least one secondary temperature higher than the primary-temperature, the primary heat exchanger being configured to extract calories in the fuel flow that is at least at the secondary temperature.

10 Claims, 2 Drawing Sheets

(51) Int. Cl.
*F02C 3/22* (2006.01)
*F02C 7/224* (2006.01)

(52) U.S. Cl.
CPC .. *F05D 2220/323* (2013.01); *F05D 2260/213* (2013.01)

(58) Field of Classification Search
CPC ..... F25J 2270/02; F17C 7/04; F17C 9/02–04; F17C 13/10
See application file for complete search history.

(56) References Cited

U.S. PATENT DOCUMENTS

| | | | |
|---|---|---|---|
| 9,752,507 B2 * | 9/2017 | Selstad | F02C 7/14 |
| 9,932,124 B2 * | 4/2018 | Kamath | F02C 9/40 |
| 10,443,503 B2 * | 10/2019 | Alecu | F02C 7/236 |
| 2021/0207540 A1 | 7/2021 | Roberge | |

OTHER PUBLICATIONS

French Search Report for FR2111578, dated Jun. 14, 2022, 2 pages.

* cited by examiner

FUEL CONDITIONING SYSTEM FOR SUPPLYING AN AIRCRAFT TURBOMACHINE, AND METHOD OF SUPPLYING A TURBOMACHINE

TECHNICAL FIELD

This invention relates to the field of aircrafts comprising turbomachines supplied by fuel stored in a cryogenic tank.

It is known to store fuel, in particular hydrogen, in liquid form to limit the overall dimension and the weight of the tanks of the aircraft. For example, the fuel is stored at a temperature of around 20 to 22 Kelvin (−253 to −251° C.) in a cryogenic tank on the aircraft.

In order to be injected into the combustion chamber of a turbomachine, the fuel must be conditioned, i.e. pressurised and heated, to ensure an optimum combustion. Conditioning is required, for example, to reduce the risk of icing/solidification of the water vapour contained in the air circulating in the turbomachine, particularly at the level of the fuel injectors of the turbomachine. With reference to [FIG. 1], a conditioning system SCAA according to the prior art is shown comprising a fuel circuit 100 connected at the inlet to a cryogenic tank R1 and at the outlet to the combustion chamber CC of a turbomachine T. A fuel flow Q circulating from upstream to downstream in the fuel circuit 100 passes successively through a mechanical pump 101 and a heating module 102.

The heating module 102 is configured to provide calories to the fuel flow Q in order to heat it so that it can be injected into the turbomachine T. The heating of the fuel flow Q is complex given that it may be in a two-phase state in the heating module 102, which makes it necessary to use a heating module 102 adapted to treat both a gaseous phase and a liquid phase, which makes the heating module 102 more complex and increases its cost.

In addition, in a known manner, a heating module 102 allows the circulation of one or more heat transfer fluids to provide calories to the fuel flow Q. Due to the very low temperature of the fuel flow Q leaving the cryogenic tank R1, there is a risk that the heat transfer fluid circulating in the heating module 102 may frost in the heating module 102, which may damage the heating module 102 or affect its efficiency.

The invention therefore aims to eliminate at least some of these disadvantages by providing a new fuel conditioning system for heating that is efficient and reliable.

Fuel conditioning systems are known in the prior art from patent applications US2021/207540A1, U.S. Pat. No. 5,203,174A, EP1672270A2 and FR2681641A1.

SUMMARY

The invention relates to a fuel conditioning system configured to supply an aircraft turbomachine with fuel coming from a cryogenic tank, the conditioning system comprising:
- a fuel circuit connected at the inlet to the cryogenic tank and at the outlet to the turbomachine, a fuel flow circulating from upstream to downstream in the fuel circuit,
- a plurality of heat exchangers, mounted in the fuel circuit, configured to transmit calories to the fuel flow, said plurality of heat exchangers comprising:
  - a primary heat exchanger configured to heat the fuel flow to at least a primary temperature,
  - at least one secondary heat exchanger, mounted downstream of the primary heat exchanger, configured to heat the fuel flow to at least one secondary temperature higher than the primary temperature, the primary heat exchanger being configured to extract calories from the fuel flow having at least the secondary temperature.

Thanks to the conditioning system according to the invention, a primary heat exchanger of the fuel/fuel type is used to carry out a preliminary heating of the fuel flow in order to avoid any risk of solidification of the heat transfer fluid. The fuel flow can then be significantly heated by the secondary heat exchanger.

Advantageously, eliminating the risk of icing/solidification in the secondary heat exchanger allows to use a secondary heat exchanger in which the two fluids circulate in counter-current or cross-current mode, both of which are more thermally efficient than the co-current mode traditionally used to reduce the risk of icing/solidification.

In addition, the primary heat exchanger allows to reduce the thermal gradients between the two fluids in the secondary heat exchanger, since the fuel fluid is partially heated in the primary heat exchanger. Reducing the thermal gradients in the secondary heat exchanger allows to result in less thermomechanical stress and, consequently, a longer service life for the secondary heat exchanger.

Preferably, as the fuel flow has a vaporisation temperature, the primary temperature is higher than the vaporisation temperature. As well as eliminating the risk of solidification, the primary heat exchanger allows to remove the liquid phase from the fuel flow, leaving only the gaseous phase, which can then be heated simply and conveniently by the secondary heat exchanger. If the pressure of the fuel is below its critical pressure (subcritical case), the primary heat exchanger allows the fuel phase to be changed, leaving only the gas phase, which can be simply heated in the secondary heat exchanger.

Preferably, for hydrogen fuel, the primary temperature is greater than 65 K. Preferably, the secondary heat exchanger is heated by a heat transfer fluid having a predetermined solidification temperature, the primary temperature being greater than the predetermined solidification temperature of the heat transfer fluid.

A primary temperature higher than the predetermined solidification temperature of the heat transfer fluid advantageously allows to prevent any solidification within the secondary heat exchanger, which improves the service life and the efficiency of the conditioning system.

Preferably, the primary temperature is greater than 100K if the heat transfer fluid is nitrogen and greater than 220K if the heat transfer fluid is carbon dioxide.

Preferably, the main heat exchanger is positioned most upstream of the plurality of heat exchangers. In this way, the main heat exchanger allows the fuel flow leaving the cryogenic tank to be treated directly in order to eliminate the liquid phase and preliminarily heat the fuel flow before it is optimally heated in the secondary heat exchanger.

Preferably, the fuel circuit comprises an upstream portion between the cryogenic tank and the primary heat exchanger, a heating loop which connects the primary heat exchanger to itself and a downstream portion between the primary heat exchanger and the turbomachine.

In one embodiment of the invention, the heating loop comprises a plurality of secondary heat exchangers. This allows to heat in stages and/or use several different heat transfer fluids and/or several different heat sources.

According to another variant of the invention, the downstream portion comprises at least one tertiary heat exchanger for heating the fuel flow to a temperature suitable for the turbomachine. This allows to ensure a high-efficiency combustion in the turbomachine.

According to a preferred aspect, the primary temperature is between 100K and 220K. Preferably, the secondary temperature is between 300K and 400K.

The invention also relates to an assembly of at least one cryogenic tank, an aircraft turbomachine and a conditioning system, as previously presented, connecting the cryogenic tank to the aircraft turbomachine.

The invention also relates to an aircraft comprising an assembly as described above.

The invention also relates to a method for supplying fuel to an aircraft turbomachine from fuel coming from a cryogenic tank by means of a conditioning system as presented above, a fuel flow circulating from upstream to downstream in the fuel circuit connecting the cryogenic tank at the inlet and the turbomachine at the outlet, the method comprising steps consisting in:

Heating the fuel flow in the primary heat exchanger to at least the primary temperature, Heating the fuel flow, in at least the secondary heat exchanger, to at least the secondary temperature higher than the primary temperature, the primary heat exchanger extracting calories from the fuel flow having at least the secondary temperature.

DESCRIPTION OF THE DRAWINGS

The invention will be better understood on reading the following description, given by way of example, with reference to the following figures, given by way of non-limiting examples, in which identical references are given to similar objects.

It should be noted that the figures set out the invention in detail in order to implement the invention, said figures of course being able to be used to better define the invention if necessary.

DETAILED DESCRIPTION

Figure 1:
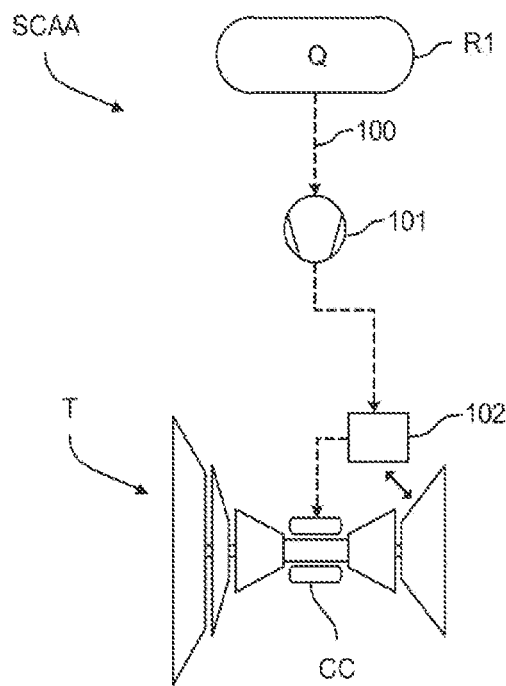
FIG. 1 is a schematic representation of a fuel conditioning system according to the prior art.
Figure 2:
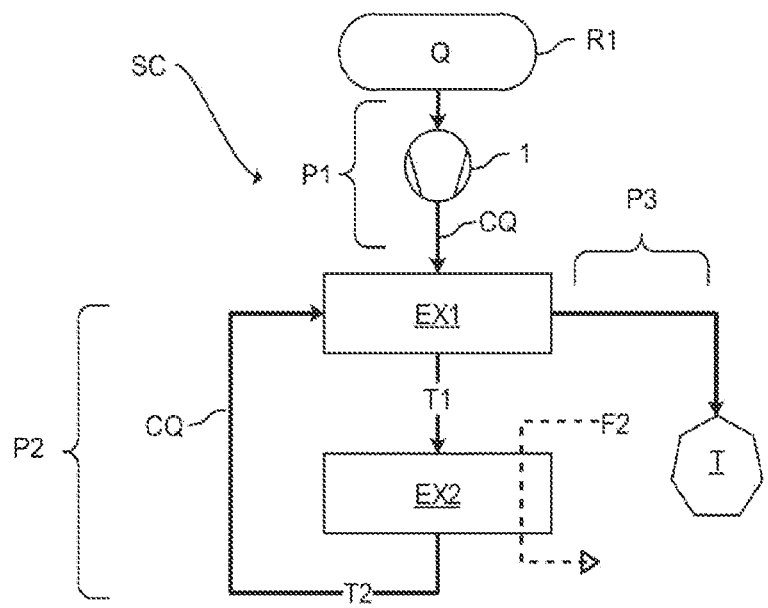
FIG. 2 is a schematic representation of a fuel conditioning system according to one embodiment of the invention.

With reference to [FIG. 2], a fuel conditioning system SC is shown, configured to supply an aircraft turbomachine T with fuel Q coming from a cryogenic tank R1. The turbomachine T is configured to ensure the propulsion of the aircraft, in particular by driving at least one propulsion member (not shown in [FIG. 2]). In this example, the fuel is liquid hydrogen, but the invention is applicable to other types of fuel, for example liquid methane or liquefied natural gas.

According to one embodiment of the invention, with reference to [FIG. 2], the conditioning system SC comprises a fuel circuit CQ (continuous line on [FIG. 2]) connected at the inlet to the cryogenic tank R1 and at the outlet to the turbomachine T. The conditioning system SC also comprises a pump 1, preferably high-pressure, configured to circulate a fuel flow Q from upstream to downstream in the fuel circuit CQ.

With reference to [FIG. 2], the conditioning system SC comprises a plurality of heat exchangers EX1, EX2, mounted in the fuel circuit CQ, configured to transmit calories to the fuel flow Q in order to heat it so that it can be injected optimally into the turbomachine T.

According to the invention, with reference to [FIG. 2], the plurality of heat exchangers comprises:

a primary heat exchanger EX1 configured to heat the fuel flow Q to at least a primary temperature T1, a secondary heat exchanger EX2, mounted downstream of the primary heat exchanger EX1, configured to heat the fuel flow Q to at least a secondary temperature T2 higher than the primary temperature T1, the primary heat exchanger EX1 being configured to extract calories from the fuel flow Q having at least the secondary temperature T2.

Primary Heat Exchanger EX1

The primary heat exchanger EX1 is, by nature, a fuel/fuel type exchanger since it allows a cold fuel flow to be heated with a hot fuel flow that will have been previously reheated by the secondary heat exchanger EX2 as illustrated in [FIG. 2], Preferably, the primary heat exchanger EX1 is the first exchanger in the fuel circuit CQ, i.e. the one located furthest upstream, closest to the cryogenic tank R1. The primary heat exchanger EX1 can be placed either in the aircraft perimeter (close to the cryogenic tank R1, short piping between the pump 1 and the primary heat exchanger EX1), or in the perimeter of the turbomachine T (long piping between the pump 1 and the primary heat exchanger EX1).

In this example, the fuel Q in the cryogenic tank R1 is hydrogen and is stored at a temperature of around 20 to 22 Kelvin (−253 to −251° C.). At this temperature, the fuel flow Q is liquid.

The use of a fuel/fuel type exchanger advantageously allows to avoid any risk of icing/solidification as the heat transfer fluid is of the same nature as the fluid to be heated. In this case, the heat transfer fluid is a fuel flow Q at the secondary temperature T2 which cannot frost when it transfers its calories to the fuel flow Q, in the liquid, two-phase or gaseous state, coming from the cryogenic tank R1. Preferably, the primary heat exchanger EX 1 is of the plate-fin type.

Advantageously, the primary heat exchanger EX1 is configured to heat the fuel flow Q to a primary temperature T1 which is higher than the vaporisation temperature of the fuel Q. Thus, downstream of the primary heat exchanger EX1, the fuel flow Q is only in the gaseous state, which facilitates its heating by the secondary heat exchanger EX2, which can thus have a simpler structure. In this example, for hydrogen, the primary temperature T1 is greater than 65K (−208° C.) so that the dihydrogen is in a gaseous state.

The primary heat exchanger EX1 thus allows a preliminary heating without the risk of solidification, the liquid phase of the fuel flow Q being conveniently eliminated.

In particular, in a supercritical case (when the fuel pressure at the outlet of the pump 1 is greater than its critical pressure), the fuel, in a liquid state at the inlet to primary heat exchanger EX1, is transformed into vapour by the addition of thermal energy. In a subcritical case (when the fuel pressure at the outlet of the pump 1 is lower than its critical pressure), a two-phase phase appears in the primary heat exchanger EX 1. In this case, the fuel, in a liquid state at the inlet to the primary heat exchanger EX1, is transformed first into a two-phase phase and then into a gaseous phase. It leaves the primary heat exchanger EX1 in a gaseous state.

Hereafter, for the sake of clarity, with reference to [FIG. 2], we define for the fuel circuit CQ:
- an upstream portion P1 between the cryogenic tank R1 and the primary heat exchanger EX1,
- a heating loop P2 which connects the primary heat exchanger EX1 to itself, the fuel flow Q entering the heating loop P2 as a cold fuel flow, to receive calories, and exiting as a hot fuel flow having transmitted calories, and
- a downstream portion P3 between the primary heat exchanger EX1 and the turbomachine T.

According to the invention, the upstream portion P1 has no heat exchanger, the primary heat exchanger EX1 being the first exchanger to heat the fuel flow Q leaving the cryogenic tank R1 to eliminate the liquid phase.

Secondary Heat Exchanger EX2

With reference to [FIG. 2], downstream of the primary heat exchanger EX1, there is a single secondary heat exchanger EX2 in which a heat transfer fluid F2 circulates to provide calories to the fuel flow Q, which is in the gaseous state. In other words, the heating loop P2 comprises only a single secondary heat exchanger EX2 in [FIG. 2]. Preferably, the secondary heat exchanger EX2 is of the shell-and-tube type.

The heat transfer fluid F2 can be of different types, for example a gas or a liquid, in particular air, oil coming from the turbomachine T, carbon dioxide or nitrogen.

In this example in [FIG. 2], a single secondary heat exchanger EX2 is shown in order to heat the fuel flow Q so that it transmits calories to the primary heat exchanger EX1 before supplying the turbomachine T.

Nevertheless, it goes without saying that the conditioning system SC could comprise several secondary heat exchangers EX2 downstream of the primary heat exchanger EX1 in order to gradually heat the fuel flow Q before it transmits calories to the primary heat exchanger EX1. In other words, the heating loop P2 could comprise several secondary heat exchangers EX2a, EX2b, EX2c. As illustrated in the variant shown in [FIG. 3], the conditioning system SC comprises three secondary heat exchangers EX2a, EX2b, EX2c which respectively receive calories from heat transfer fluids F2a, F2b, F2c. The use of several secondary heat exchangers EX2a, EX2b, EX2c allows progressive heating but also the use of different heat sources and/or different heat transfer fluids F2a, F2b, F2c. This gives the conditioning system SC greater flexibility to take account of the heat sources available.

The secondary heat exchangers EX2a, EX2b, EX2c can be placed in different positions, for example, in the aircraft perimeter in order to recover waste heat on the aircraft side (cabin outlet air, calories coming from the cooling of the electrical elements, etc.), or in the perimeter of the turbomachine T to recover available waste heat (nozzle exit gas, engine oil, etc.), or distributed between the two perimeters (aircraft and turbomachine) in order to judiciously recover the hot sources available either at the level of the aircraft or at the level of the turbomachine.

Preferably, the primary temperature T1 is higher than the solidification temperature of the heat transfer fluid F2 circulating in the secondary heat exchanger EX2 located directly downstream of the primary heat exchanger EX 1 in the fuel circuit CQ. In this way, there is no risk of the fuel flow Q, having a primary temperature T1, freezing the heat transfer fluid F2. In the example shown in [FIG. 3], the primary temperature T1 is higher than the solidification temperature of the heat transfer fluid F2a circulating in the secondary heat exchanger EX2a.

Preferably, the heat transfer fluid F2 circulating in the secondary heat exchanger EX2 located directly downstream of the primary heat exchanger EX1 is nitrogen, having a solidification temperature of the order of 100K (−173° C.), or carbon dioxide, having a solidification temperature of the order of 215K (−58° C.).

To meet the needs of the heat exchangers EX1, EX2 optimally, the primary temperature T1 is preferably between 100K and 220K (−173° C. and −53° C.).

Preferably, the secondary heat exchanger EX2 heats the fuel flow Q to at least a secondary temperature T2 higher than the primary temperature T1. Preferably, to allow an optimum heating (efficiency, flow rate, etc.) in the primary heat exchanger EX1, the secondary temperature T2 is between 300K and 400K.

The injection temperature of the fuel flow Q into the turbomachine T should preferably be around 250K to 300K, in particular to avoid any risk of icing of the water vapour contained in the air in contact with the fuel injectors in the combustion chamber of the turbomachine T. Consequently, the secondary temperature T2 at the outlet of the secondary heat exchanger EX2 must be higher than this injection range since the heat transfer fluid F2 is cooled as it passes through the primary heat exchanger EX1.

Figure 3:
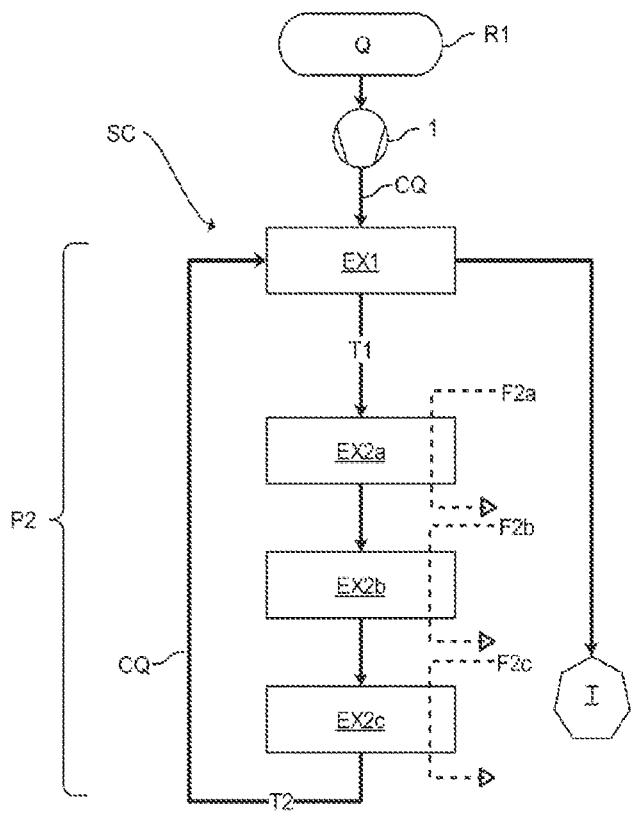
FIG. 3 is a schematic representation of a fuel conditioning system according to a first variant of the invention.
Figure 4:
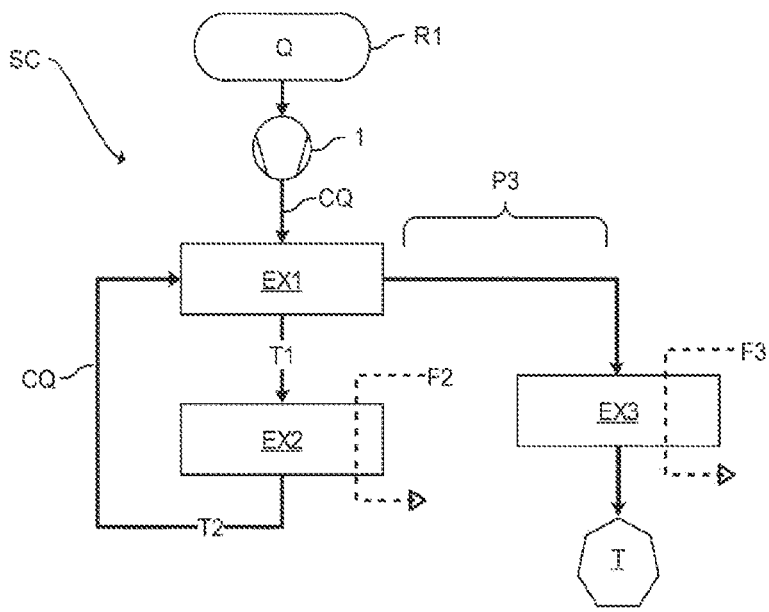
FIG. 4 is a schematic representation of a fuel conditioning system according to a second variant of the invention.

According to another variant of the invention, with reference to [FIG. 4], the downstream portion P3 of the fuel circuit CQ comprises a tertiary heat exchanger EX3 in which a heat transfer fluid F3 circulates to provide calories to the fuel flow Q before it is injected into the turbomachine T. The heat transfer fluid F3 can be of different types and extracts calories from different types of hot source, preferably the waste heat from the turbomachine T. A single tertiary heat exchanger EX3 is shown in [FIG. 4] but there could be more. It goes without saying that the different variants shown in FIGS. 2 to 4 are compatible with each other.

An example of the implementation of the invention of a method for supplying fuel to a turbomachine T will be presented with reference to [FIG. 2]. In this example, the pump 1 circulates the fuel flow Q from the cryogenic tank R1 through the fuel circuit CQ to the turbomachine T.

In this example of implementation, the fuel is dihydrogen and the heat transfer fluid F2 circulating in the secondary heat exchanger EX2 is nitrogen.

The method comprises a step E1 consisting of heating the fuel flow Q, in the primary heat exchanger EX1, to at least the primary temperature T1.

In this example, the primary temperature T1 is 115K to ensure that the fuel is only in a gaseous state and to prevent the nitrogen in the secondary heat exchanger EX2 from solidifying.

The method comprises a step E2 consisting of heating the fuel flow Q, in the secondary heat exchanger EX2, to the secondary temperature T2 of 350K. Such a secondary temperature T2, at the outlet of the heating loop P2, allows the fuel flow Q in the primary heat exchanger EX1 to be heated optimally. It goes without saying that the secondary temperature T2 could be obtained by adding calories from different secondary heat exchangers EX2a, EX2b, EX2c as shown in the variant in [FIG. 3].

After providing calories to the primary heat exchanger EX1, the fuel flow Q is injected into the turbomachine T at a temperature of around 300K, preventing any icing up of the injectors. Additional heating can be provided in the downstream portion P3 of the fuel circuit CQ in order to obtain the optimum injection temperature in the turbomachine T as shown in [FIG. 4].

Thanks to the invention, the fuel Q is heated in a practical and efficient way without any risk of solidification, which means that the turbomachine T can be supplied under optimum conditions.

The invention claimed is:

1. A fuel conditioning system configured to supply an aircraft turbomachine with fuel coming from a cryogenic tank, the conditioning system comprising:
   a fuel circuit comprising an inlet that is connected to the cryogenic tank and an outlet connected to the turbomachine,
   a fuel flow circulating from upstream to downstream in the fuel circuit, and
   a plurality of heat exchangers, mounted in the fuel circuit, configured to transmit calories to the fuel flow, said plurality of heat exchangers comprising:
   a primary heat exchanger configured to heat the fuel flow to a temperature greater than or equal to a primary temperature, and
   at least one secondary heat exchanger, mounted downstream of the primary heat exchanger, configured to heat the fuel flow to a temperature greater than or equal to a secondary temperature,
   said secondary temperature being higher than the primary temperature,
   the primary heat exchanger being configured to extract calories from the fuel flow having the temperature greater than or equal to the secondary temperature.

2. The fuel conditioning system of claim 1, wherein the fuel flow defines a vaporisation temperature, and wherein the primary temperature is greater than the vaporisation temperature.

3. The fuel conditioning system according to claim 1, wherein the at least one secondary heat exchanger is heated by a heat transfer fluid having a predetermined solidification temperature, the primary temperature being higher than the predetermined solidification temperature of the heat transfer fluid.

4. The fuel conditioning system according to claim 1, wherein the primary heat exchanger is positioned most upstream of the plurality of heat exchangers.

5. The fuel conditioning system according to claim 1, wherein the fuel circuit comprises an upstream portion between the cryogenic tank and the primary heat exchanger, a heating loop which connects the primary heat exchanger to itself, and a downstream portion between the primary heat exchanger and the turbomachine, the at least one secondary heat exchanger being mounted in the heating loop.

6. The fuel conditioning system of claim 5, wherein the heating loop comprises a plurality of the secondary heat exchangers.

7. The fuel conditioning system according to claim 5, wherein the downstream portion comprises at least one tertiary heat exchanger for heating the fuel flow to a temperature suitable for the turbomachine.

8. The fuel conditioning system according to claim 1, wherein the primary temperature is between 100K and 220K.

9. The fuel conditioning system according to claim 1, wherein the secondary temperature is between 300K and 400K.

10. A method for supplying an aircraft turbomachine with a fuel coming from a cryogenic tank by means of a conditioning system, the conditioning system including
   a fuel circuit comprising an inlet connected to the cryogenic tank and an outlet connected to the turbomachine,
   a fuel flow of the fuel circulating from upstream to downstream in the fuel circuit, and
   a plurality of heat exchangers, mounted in the fuel circuit, configured to transmit calories to the fuel flow,
   said plurality of heat exchangers including a primary heat exchanger configured to heat the fuel flow to a temperature greater than or equal to a primary temperature, and
   at least one secondary heat exchanger, mounted downstream of the primary heat exchanger, configured to heat the fuel flow to a temperature greater than or equal to a secondary temperature,
   said secondary temperature being higher than the primary temperature,
   the primary heat exchanger being configured to extract calories from the fuel flow having the temperature greater than or equal to the secondary temperature, the method comprising:
   heating the fuel flow in the primary heat exchanger to the temperature greater than or equal to the primary temperature, and
   heating the fuel flow, in the at least one secondary heat exchanger, to the temperature greater than or equal to the secondary temperature higher than the primary temperature, the primary heat exchanger extracting calories from the fuel flow having the temperature greater than or equal to the secondary temperature.

* * * * *